United States Patent
Ma

(10) Patent No.: US 8,357,877 B2
(45) Date of Patent: Jan. 22, 2013

(54) FRONT CONSUMABLES FOR PULSE GMAW TORCHES

(75) Inventor: Tiejun Ma, Tecumseh (CA)

(73) Assignee: Illinois Tool Works Inc., Glenview, IL (US)

( * ) Notice: Subject to any disclaimer, the term of this patent is extended or adjusted under 35 U.S.C. 154(b) by 374 days.

(21) Appl. No.: 12/758,347

(22) Filed: Apr. 12, 2010

(65) Prior Publication Data

US 2010/0314374 A1    Dec. 16, 2010

Related U.S. Application Data

(60) Provisional application No. 61/186,257, filed on Jun. 11, 2009.

(51) Int. Cl.
*H01L 9/28* (2006.01)

(52) U.S. Cl. ............... 219/137.61; 219/136; 219/137.52

(58) Field of Classification Search ............. 219/137.61, 219/137.62, 137.42, 137
See application file for complete search history.

(56) References Cited

U.S. PATENT DOCUMENTS

| | | | |
|---|---|---|---|
| 3,502,841 A | 3/1970 | Heer | |
| 4,560,858 A | 12/1985 | Manning | |
| 4,733,052 A | 3/1988 | Nilsson et al. | |
| 5,556,562 A | 9/1996 | Sorenson | |
| 5,635,091 A * | 6/1997 | Hori et al. | 219/137.61 |
| 6,093,907 A | 7/2000 | Hidaka | |
| 6,200,519 B1 | 3/2001 | Wimroither | |
| 6,559,416 B1 * | 5/2003 | Steenis et al. | 219/137.61 |
| 6,710,300 B2 | 3/2004 | Steenis et al. | |
| 6,943,318 B2 * | 9/2005 | Takagi et al. | 219/137.61 |
| 7,381,923 B2 | 6/2008 | Gordon et al. | |
| 2003/0127444 A1 * | 7/2003 | Steenis et al. | 219/137.61 |
| 2004/0188406 A1 | 9/2004 | Brabander | |
| 2006/0151453 A1 | 7/2006 | Gordon et al. | |
| 2008/0035623 A1 | 2/2008 | Hutchison | |
| 2008/0061050 A1 | 3/2008 | Walters | |
| 2008/0314876 A1 | 12/2008 | Pinsonneault et al. | |

FOREIGN PATENT DOCUMENTS

| | | |
|---|---|---|
| DE | 8324148 | 11/1983 |
| DE | 202007004012 | 8/2007 |
| JP | 63080978 | 4/1988 |
| JP | 04294870 | 10/1992 |
| JP | 09136165 | 5/1997 |

OTHER PUBLICATIONS

Holm, R., "Electrical contacts, Theory and applications," pp. 87-92, 4th ed., Springer, 2000.

Luijendijk, T. et al., "Calculation of the electrical resistance between contact tube and welding wire during GMA welding based on measurement of the contact force," Int. J. For the Joining of Materials, pp. 1-4, vol. 8(1), 1996.

(Continued)

*Primary Examiner* — Dung A. Le

(74) *Attorney, Agent, or Firm* — Fildes & Outland, P.C.

(57) ABSTRACT

A contact tip for a welding torch in accordance with the present invention includes an elongated, generally cylindrical body having a front contact end and an opposite rear retaining end. A central aperture is defined by an inner wall of the body. The aperture extends through the body from an opening at the rear retaining end to an opening at the front contact end. The aperture has a front portion and a wider diameter portion adjacent the front portion. The front portion generally has a length that is shorter than a length of the wider diameter portion. A consumable electrode wire fed through the aperture contacts the inner wall in the front portion but does not contact the inner wall in the wider diameter portion.

14 Claims, 7 Drawing Sheets

OTHER PUBLICATIONS

Chandurkar, D. et al., "Experimental study of the effect of a contact conditioner on sliding electrical contacts," Proceedings of the 3rd Annual GRASP Symposium, pp. 211-212, Wichita State University, 2007.

Mohler, W. et al., "Contact tubes with improved characteristics—made of extruded composite materials," Welding & Cutting, pp. 214-216, vol. 53, No. 9, 2001.

Thier, H. et al., "Current contact tip life—Evaluation for different contact tip materials and shapes," Welding and Cutting, pp. 22-27, vol. 46, No. 5, 1995.

Shimizu, H. et al, "Wear mechanism in contact tube," Science and Technology of Welding and Joining, pp. 94-105, vol. 11, No. 1, 2006.

* cited by examiner

FRONT CONSUMABLES FOR PULSE GMAW TORCHES

CROSS REFERENCE TO RELATED APPLICATION

This application claims the priority of U.S. Provisional Application No. 61/186,257 filed Jun. 11, 2009.

TECHNICAL FIELD

This invention relates to front components of a GMAW (gas metal arc welding), MIG (metal inert gas), MAG (metal active gas), SAW (submerged arc welding), or FCAW (flux cored arc welding) welding torch, and more particularly to contact tips and retaining heads of welding torches.

BACKGROUND OF THE INVENTION

A conventional welding torch generally includes a cable assembly connected to a torch body, a gooseneck extending from the body, and a torch head at a distal end of the gooseneck. The torch head typically includes a retaining head and/or diffuser, a contact tip, and a nozzle. Welding wire (consumable electrode) and shielding gas are fed through the cable assembly and gooseneck to the torch head, where the welding wire and shielding gas are fed out of the contact tip and nozzle.

Common metal welding techniques employ heat generated by electrical arcing to transition a portion of a workpiece to a molten state, and the addition of filler metal from the welding wire. Energy (e.g., welding current) is transferred from the cable assembly and gooseneck through the front components of the torch including the retaining head and contact tip, to the consumable electrode welding wire. When a trigger on the welding torch is operated or an "on" signal is assigned by a robot/automatic controller, electrode wire is advanced toward the contact tip, at which point current is conducted from the contact tip into the exiting welding wire. A current arc forms between the electrode wire and the workpiece, completing a circuit and generating sufficient heat to melt the electrode wire to weld the workpiece. The shielding gas helps generate the arc and protects the weld. As the electrode wire is consumed and becomes a part of the weld, new electrode wire is advanced, continuously replacing the consumed electrode wire and maintaining the welding arc.

In order to increase welding speeds (e.g., the travelling speed) and to reduce spatter generation in welding applications, welding power sources have been utilizing modern waveforms that are represented by pulse and controlled short circuit. As shown in FIG. 1, these waveforms typically use high peak current (I_Peak) in a short pulse period and high current ramp rate. For example, 300 amps is usually regarded as a high current (I_CV) for 1.13 mm (0.045 inch) outer diameter (OD) solid steel electrode wire in constant voltage welding applications. In contrast, in pulse welding applications it is common for this same electrode wire to be welded at a peak current of 500 amps. This 67% higher current results in 178% more heat generation (in joules) at the contact tip—electrode wire interface, according to the rule $E=I^2Rt$ where E represents heat in joules, I represents the current, R represents the electric resistance across the contact tip—electrode wire interface, and t represents a duration of time.

The high welding current and high current ramp rate transferring across the contact tip—electrode wire interface during pulse welding applications causes local melt or evaporation (e.g., arc erosion) on both the electrode wire and the contact tip. For example, burn marks form on the electrode wire as it is fed through the contact tip. This pattern of burn marks on the electrode wire is a characteristic feature of modern pulse waveform welding and is not seen on electrode wire fed through contact tips during constant voltage welding modes. It is also postulated that similar damage occurs on the inner surface of the contact tip where welding current is transferred to the electrode wire. However, burn marks cannot be or are difficult to observe on the inner surface of a used contact tip due to tribological wear of the burn features by the feeding of the electrode wire against the inner surface of the contact tip.

Arc erosion during pulse welding applications causes substantial wear removal of the contact tip, and practical data indicates that contact tips deteriorate faster in pulse welding applications in comparison to constant voltage applications. For example, the length of a wear mark on an inner surface of a contact tip used for 20 minutes in a constant voltage application was measured at approximately 3 mm. Using the same pack of electrode wire and the same wire feeding speed, the length of a wear mark of a contact tip used for minutes in a pulse application was measured at approximately 11 mm. After two hours of pulse welding, the wear mark on the same contact tip measured 17.5 mm. Thus, it is apparent that pulse welding can cause significantly more contact tip wear than constant voltage welding.

As a contact tip is used and deteriorated, the energy transfer efficiency between the contact tip and the electrode wire decreases. This results in lower energy consumption at the arc. When the energy consumption is too low to maintain a smooth welding arc, stubbing occurs, which causes undesired welding defects such as cold welding and discontinuous beads.

Further, electrode wire always has an inherent cast, or curvature, due to the packaging of the electrode wire and the fact that the electrode wire if fed through a curved welding torch. The curved electrode wire is bent (elastically or plastically) inside the contact tip when it is forced into the central hole that extends through the contact tip. The electrode wire is typically bent against one "side" of the contact tip hole at a front end (called the front contact point) of the contact tip and at an opposite "side" of the contact tip hole at a rear end (called the rear contact point) of the contact tip. This mechanical bend is essential for the contacting force and ensures electrical conduction between the electrode wire and the contact tip.

FIG. 2 illustrates the contour of a section of electrode wire 20 inside a used (worn) contact tip 22. As the contact tip 22 is used and worn, the front portion 24 of the contact tip hole is damaged (e.g., keyholed when viewed from the front end), and the contact point 26 becomes a contact area 28. The welding current, which in a new contact tip is delivered to the electrode wire at the very front end of the bore 24, is now transferred across the contact area 28 (as depicted by arrow 30). This increases the total electric resistance of the welding circuit and causes low welding current, or low efficiency of the contact tip.

One method that has been used to mitigate the deterioration of the contact tip is to increase the mechanical contact force between the contact tip and the electrode wire, such as by spring mechanisms, S-shaped contour of the bore of the contact tip, or introduction of more curvature to the electrode wire before feeding it into the contact tip. Improving the contact force reduces the electrical resistance and the fluctuation of electrical resistance across the interface, thus improving the contact tip efficiency. However, these designs are either too expensive to be commercialized, or too fragile to tolerate the harsh nature of the welding environment, such as high temperatures and spatter.

SUMMARY OF THE INVENTION

The present invention provides a welding torch retaining head and contact tip that maintains and/or increases the mechanical contact force of electrode wire against the contact tip, thereby reducing electrical resistance and arc erosion. In contrast to the prior art which increases contact force of the electrode wire against the contact tip, the present invention reduces the size of the contact area. As shown in FIG. 2, though the electrode wire contacts the contact tip 22 across the entire contact area 28 in a conventional worn contact tip, the welding current (depicted by arrow 30) tends to travel across the interface at a front region 32 due to the electrical resistance of the contact tip 22 (typically made out of copper or copper alloys) being lower than that of the electrode wire 20 (typically made out of steel, stainless steel, or aluminum). The mechanical support provided by a rear region 34 of the contact area 28 does not contribute to the efficiency of the contact tip. A contact tip in accordance with the present invention has an internal portion removed that corresponds to a rear region of the front contact area that would provide mechanical support but not the welding current to the electrode wire. Removing this mechanical support secures the contact force at the front region. Thus, the contact force between the contact tip and the electrode wire is wholly applied at a front region of the contact area where electrical current travels. The resulting improved mechanical contact between the contact tip and electrode wire reduces electrical resistance and consequently reduces arc erosion. This improves the stability of electrical conduction, the welding current, the welding arc, and the performance of the contact tip. Removal of an internal portion of the contact tip also reduces or eliminates fluctuations in the mechanical support provided to the electrode wire as the electrode wire is fed through the contact tip at speeds of 13 to 42 cm/second (300 to 1000 inches per minute), thus reducing fluctuations of the welding arc and arc erosion on the contact tip.

More particularly, a contact tip for a welding torch in accordance with the present invention includes an elongated, generally cylindrical body having a front contact end and an opposite rear retaining end. A central aperture is defined by an inner wall of the body. The aperture extends through the body from an opening at the rear end to an opening at the front end. The aperture has a front portion and a wider diameter portion adjacent the front portion. The front portion generally has a length that is shorter than a length of the wider diameter portion. A consumable electrode wire fed through the aperture does not contact the inner wall in the wider diameter portion.

The aperture may have a generally stepped cross-sectional shape along an axial direction. The aperture may have three coaxial portions including the front portion, a middle portion defining the wider diameter portion, and a rear portion. The front, middle, and rear portions each have a diameter defined by the inner wall of the body. The diameter of the middle portion is larger than the diameters of each of the front and rear portions. A consumable electrode wire fed through the aperture only contacts the inner wall in the front and rear portions. The diameter of the front portion may be generally 2% to 10% greater than a diameter of the consumable electrode wire that is fed through the hole. The diameter of the rear portion may be generally 5% to 15% greater than the diameter of the consumable electrode wire. The diameter of the middle portion may be at least generally 0.15 mm larger than the diameter of the front portion, and the diameter of the wider diameter portion may be variable. The length of the front portion may be generally between 1.5 mm and 15 mm, the length of the rear portion may be generally between 1.5 mm and 15 mm, and the length of the middle portion may be greater than the length of the front portion and the rear portion.

Alternatively, the contact tip may include a rear insert inserted into the opening at the rear end of the body. The rear insert includes a central bore extending therethrough. The bore of the rear insert is generally continuous with the aperture in the contact tip body. The diameter of the middle portion is generally larger than the diameter of the front portion and the diameter of the bore of the rear insert.

The contact tip may include a front insert inserted into the opening at the front end of the body. The front insert includes a central bore extending therethrough. The bore in the front insert is generally continuous with the aperture in the body and has a length that is shorter than the length of the middle portion. The diameter of the middle portion is generally larger than the diameter of the rear portion and a diameter of the bore in the front insert.

Optionally, the contact tip body may be formed of two interlocking members.

The contact tip may be arranged in combination with a retaining head for a welding torch. The retaining head has a front end, a rear end, and an opening at the front end. The contact tip is retained in the opening at the front end of the retaining head. The contact tip and the retaining head together define a passageway for the consumable electrode wire. The passageway includes the front portion of the contact tip aperture, a rear portion disposed in the retaining head, and a middle portion at least partially defined by the wider diameter portion of the contact tip aperture. The front portion of the passageway may have a length that is shorter than a length of the middle portion. A consumable electrode wire fed through the passageway does not contact the retaining head and contact tip in the middle portion of the passageway and only contacts the retaining head and the contact tip in the front and rear portions of the passageway.

Optionally, the length of the front portion may be generally between 1.5 mm and 15 mm. The middle portion may be defined by the wider diameter portion of the contact tip aperture and the opening in the retaining head. A rear insert may be inserted into the retaining head. The rear insert may include a central bore extending therethrough. The bore may form a portion of the passageway and may be generally continuous with the middle portion of the passageway. A front insert may be inserted into the opening at the rear end of the contact tip body. The front insert may include a central bore extending therethrough. The bore of the front insert may partially define the front portion of the passageway and may be generally continuous with the middle portion of the passageway.

A welding torch assembly in accordance with the present invention includes a retaining head and a contact tip engaged with the retaining head. The retaining head and the contact tip together define a passageway for a consumable electrode wire. The passageway includes a front portion, a rear portion, and a middle portion between the front and rear portions. The middle portion has a diameter and a length that is larger than a length and a width of the front and rear portions. A consumable electrode wire fed through the passageway does not contact the retaining head and contact tip in the middle portion of the passageway and only contacts the retaining head and the contact tip in the front and rear portions of the passageway.

Optionally, the length of the front portion may be generally between 1.5 mm and 15 mm. The middle portion of the passageway may be formed by one of the contact tip alone or the contact tip and the retaining head together. A rear insert may be inserted into the retaining head. The rear insert includes a central bore extending therethrough. The bore in the rear insert at least partially forms the rear portion of the passageway and is generally continuous with the middle portion of the passageway. A front insert may be inserted into the contact tip. The front insert includes a central bore extending therethrough. The bore in the front insert at least partially forms the front portion of the passageway and is generally continuous with the middle portion of the passageway.

These and other features and advantages of the invention will be more fully understood from the following detailed description of the invention taken together with the accompanying drawings.

DETAILED DESCRIPTION OF THE INVENTION

Figure 1:
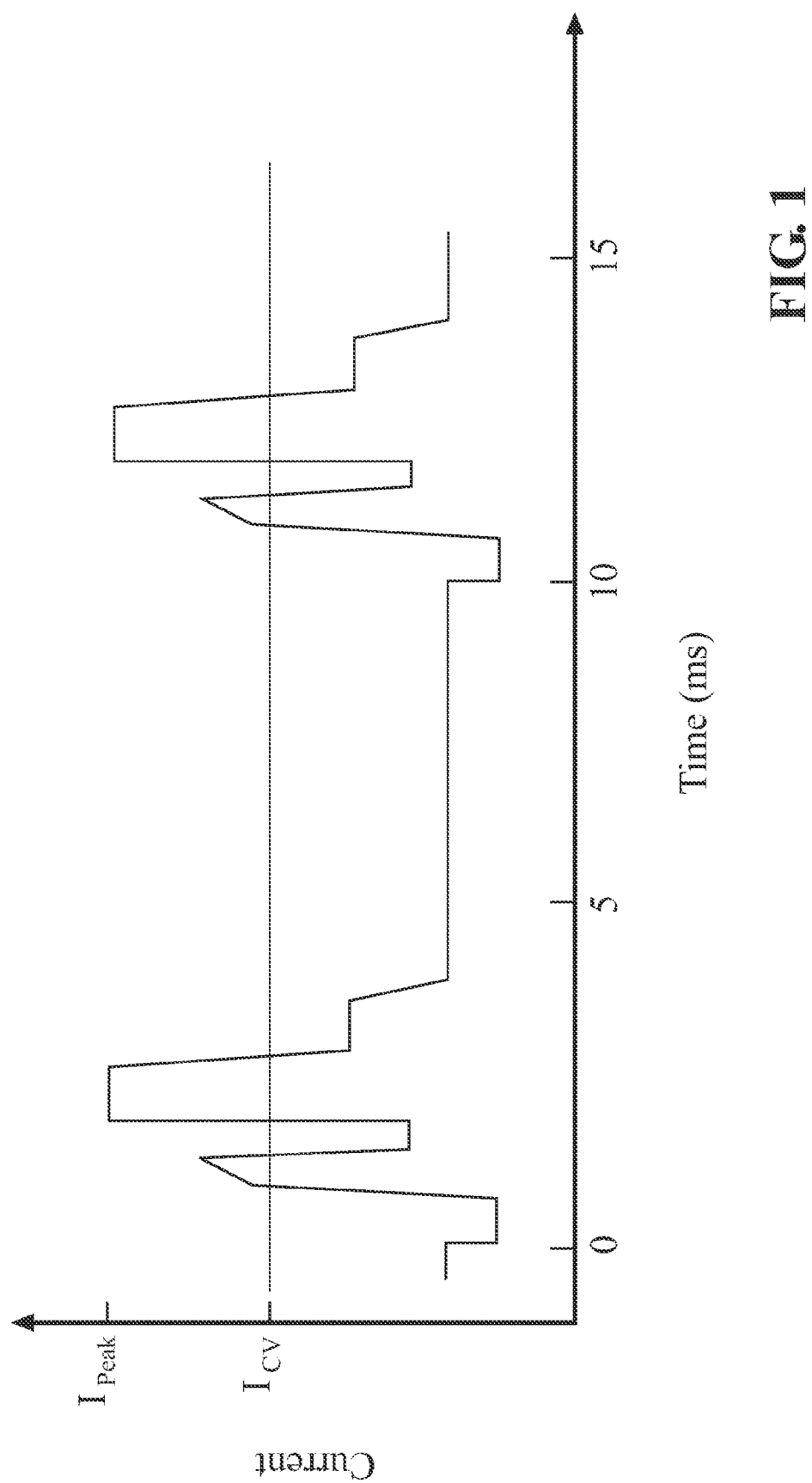
FIG. 1 is a graph of welding current versus time illustrating a constant voltage waveform and a pulse welding waveform.
Figure 2:
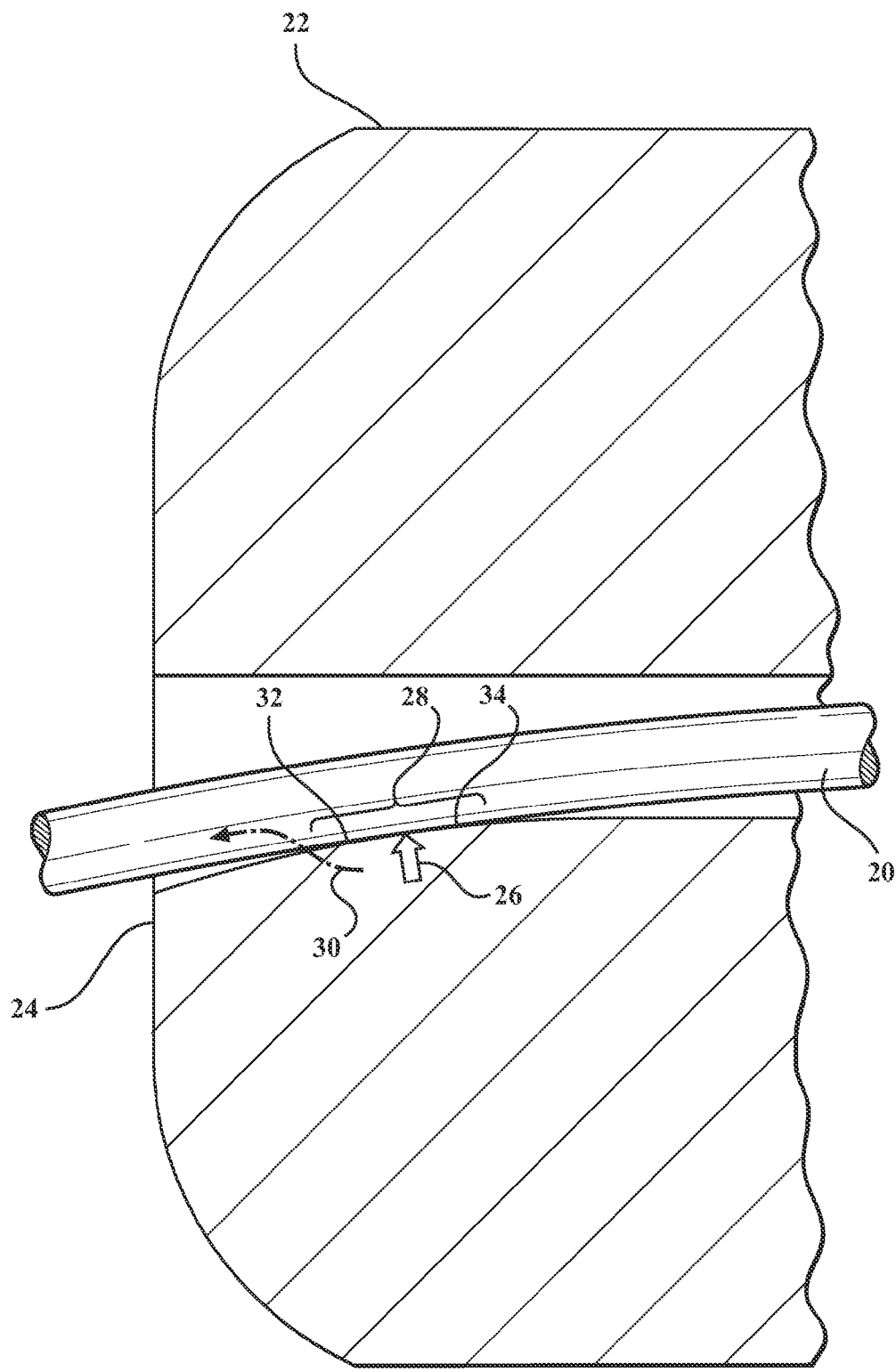
FIG. 2 is a schematic sectional view of a worn conventional contact tip illustrating the contour of electrode wire inside the contact tip and the contact of the electrode wire against the contact tip.
Figure 3:
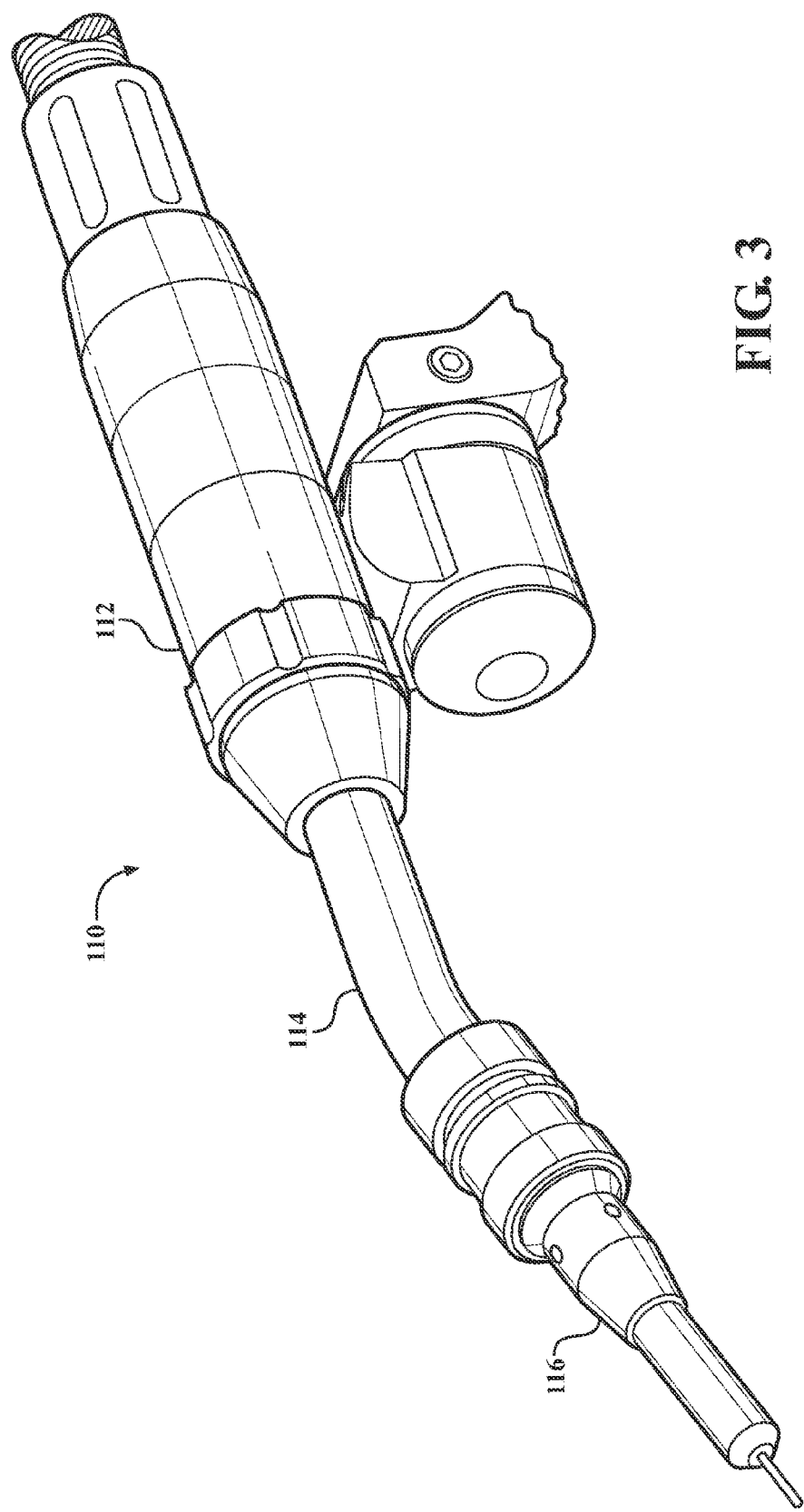
FIG. 3 is a perspective view of a robotic GMAW torch including a contact tip and retaining head in accordance with the present invention.

Referring now to the drawings in detail, numeral 110 generally indicates a welding torch such as a gas metal arc welding (GMAW) torch or a similar welding torch. As shown in FIG. 3, the welding torch 110 broadly includes a torch body 112, a gooseneck 114 extending from a forward end of the torch body, and a contact tip assembly 116 at a distal end of the gooseneck. The contact tip assembly 116 generally includes front consumable components such as a retaining head and contact tip which are discussed in greater detail below. During use of the welding torch 110, the contact tip assembly 116 may be covered and protected by a nozzle. A cable (not shown) is connected to a rear end of the torch body 112. The cable supplies at least one of electrical current, shielding gas, and a consumable electrode wire (e.g., a metal welding wire) to the torch body 112. The electrical current, shielding gas, and consumable electrode wire travel through the torch body 112 to the gooseneck 114 and ultimately exit through an orifice in the contact tip assembly 116.

The welding wire, when energized for welding, carries a certain electrical potential. When the welding wire approaches or makes contact with target metal workpieces, an electrical arc is generated, and an electrical circuit is completed and current flows through the welding wire, across the metal workpieces and to ground. The current causes the welding wire and the parent metal of the workpieces in contact with the welding arc to melt, thereby joining the workpieces as the melt solidifies.

Figure 4:
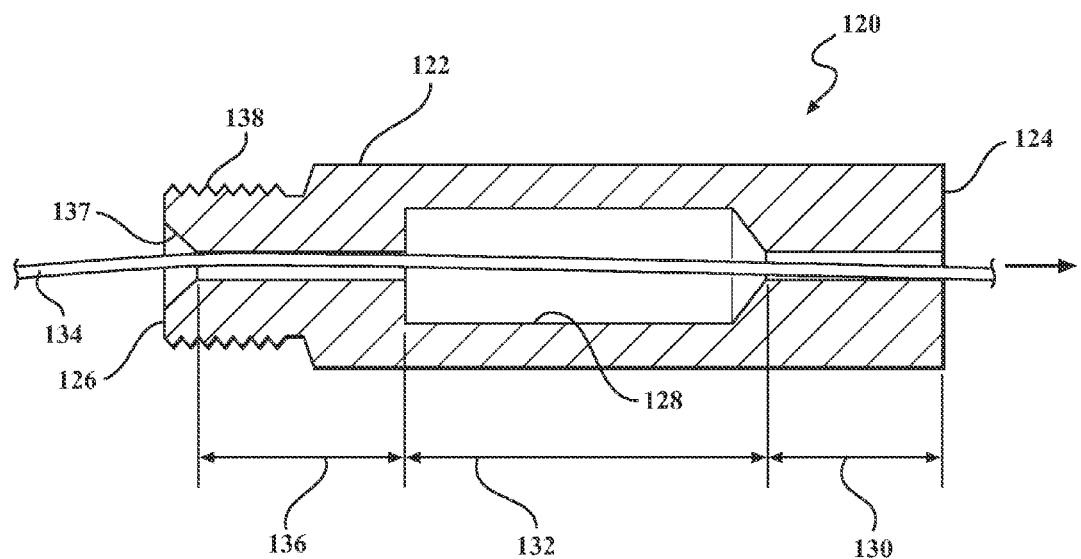
FIG. 4 is a sectional view of a contact tip in accordance with the present invention.

Turning to FIG. 4, a contact tip 120 in accordance with the invention has an elongated, generally cylindrical body 122 that may be made of copper, a copper alloy, or other similarly suitable material. The body 122 has a front contact end 124 having an opening from which electrode wire exits and an opposite rear retaining end 126 having an opening into which the electrode wire is fed. A central aperture 128 defined by an inner wall of the body extends through the body from the opening at the rear end 126 to the opening at the front end 124. The central aperture 128 provides a passageway for electrode wire through the contact tip 120, and has a generally stepped cross-sectional shape along an axial direction of the contact tip. More specifically, the central aperture 128 has a front portion 130 and a wider diameter portion 132 adjacent the front portion. The wider diameter portion 132 generally has a larger diameter than the front portion 130. The front portion 130 generally has a length that is shorter than the length of the wider diameter portion 132. Due to the short length of the front portion 130 and the widening of the passageway through the contact tip 120 in the adjacent wider diameter portion 132, a consumable electrode wire 134 fed through the central aperture 128 does not contact the inner wall of the contact tip body 122 in the wider diameter portion. Thus, the wider diameter portion 132 does not provide any mechanical support for the electrode wire 134, and the contact force between the contact tip 120 and the electrode wire is applied in the front portion 130 where electric current is transferred from the contact tip to the electrode wire. The improved electrical contact between the contact tip and electrode wire reduces electrical resistance, which reduces arc erosion and lengthens the effective life of the contact tip.

In one embodiment, the contact tip aperture 128 may have three coaxial portions including the front portion 130 at the front end 124 of the contact tip, a rear portion 136 at the rear end of the contact tip, and the wider diameter portion 132 which is a middle portion disposed between the front and rear portions. The diameter of the middle portion 132 is larger than the diameter of both the front portion 130 and the rear portion 136, and the electrode wire 134 only contacts the inner wall in the front and rear portions of the aperture 128 and does not contact the inner wall in the middle portion 132. The diameter of the front portion 130 may be generally 2 to 10 percent greater than the diameter of the electrode wire 134 that is fed through the aperture 128 (e.g., the electrode wire may have a diameter of approximately 0.045 inches). The diameter of the rear portion 136 may be generally 5 to 15 percent greater than the diameter of the electrode wire 134. The diameter of the middle portion 132 may be at least generally 0.15 mm larger than the diameter of the front portion 130. The length of the front portion 130 may be generally between 1.5 and 15 mm, and for example may be 8 mm. The length of the rear portion 136 may be generally between 1.5 and 15 mm, and for example may be 10 mm. The length of the middle portion 132 is greater than the length of either the front portion 130 or the rear portion 136.

The diameter of the wider, middle portion 132 may be variable or irregular. For example, instead of having a single, generally constant diameter throughout, the middle portion 132 may have a diameter that varies stepwise in an axial direction or may have a sloped or slotted profile. As shown in FIG. 4, the diameter of the middle portion 132 decreases from its largest value down to the diameter of the front portion 130 at the boundary between the front portion and the middle portion. The inner wall of the contact tip body 122 thereby has a cone shape at the transition from the middle portion 132 to the front portion 130. The middle portion 132 of the aperture 128 need not have any specific cross-sectional shape so long as the diameter of the middle portion 132 is generally large enough to form an open space in the contact tip body 122 in which an electrode wire travelling through the aperture will not contact the contact tip body. Also, the rear portion 136 of the contact tip aperture 128 may have a slopped rear end 137 that forms a cone or other similar shape. The slopped rear end 137 may aide in feeding an electrode wire into the contact tip aperture 128.

The contact tip 120 may include a cooperable mounting feature 138 such as threads that cooperate with a related feature in a retaining head for mounting and securing the contact tip in the retaining head. Alternative means for mounting the contact tip in a retaining head include but are not limited to solders, crimps, forges, and press fit connections.

Figure 5:
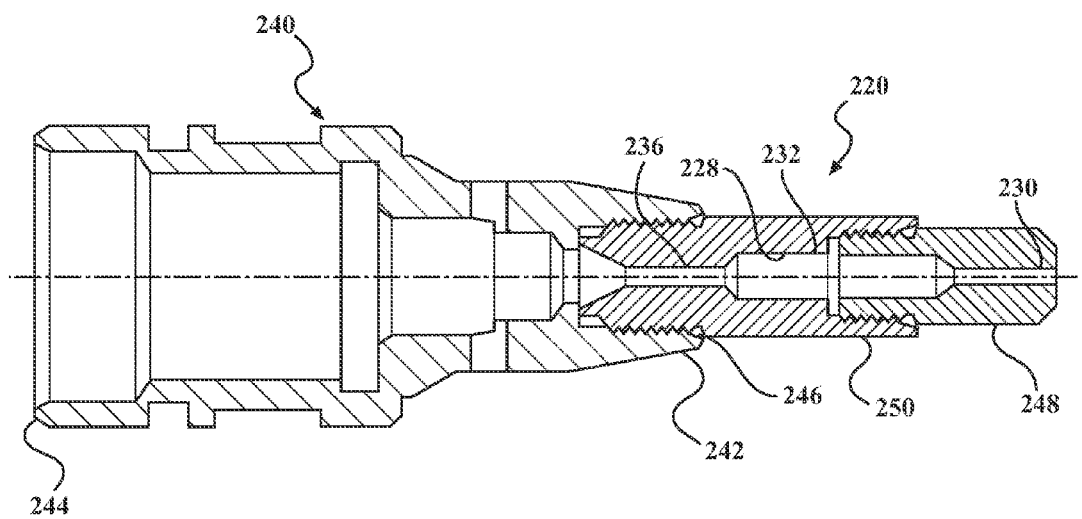
FIG. 5 is a sectional view of a contact tip and retaining head assembly in accordance with the present invention.

For example, turning to FIG. 5, a welding torch assembly of front components in accordance with the invention includes a contact tip 220 mounted and secured in a retaining head 240. The retaining head 240 has a front end 242, an opposite rear end 244, and an opening 246 at the front end. The opening 246 may generally extend from the front end 242 to the rear end 244 to form an aperture through the retaining head. The contact tip 220 is securely retained in the opening 246 at the front end of the retaining head. The opening 246 in the retaining head is continuous with the central aperture 228 through the contact tip body, and the contact tip 220 and retaining head 240 together define a passageway for a consumable electrode wire.

Optionally, as shown in FIG. 5, the contact tip body may be formed of two interlocking members 248, 250 for ease of manufacturing. The front portion 230 of the central aperture 228 is formed in the first member 248, the rear portion 236 of the aperture is formed in the second member 250, and the middle portion 232 is formed partially in the first member and partially in the second member. However, the middle portion may be formed mostly or entirely in either the first member or the second member.

Figure 6:
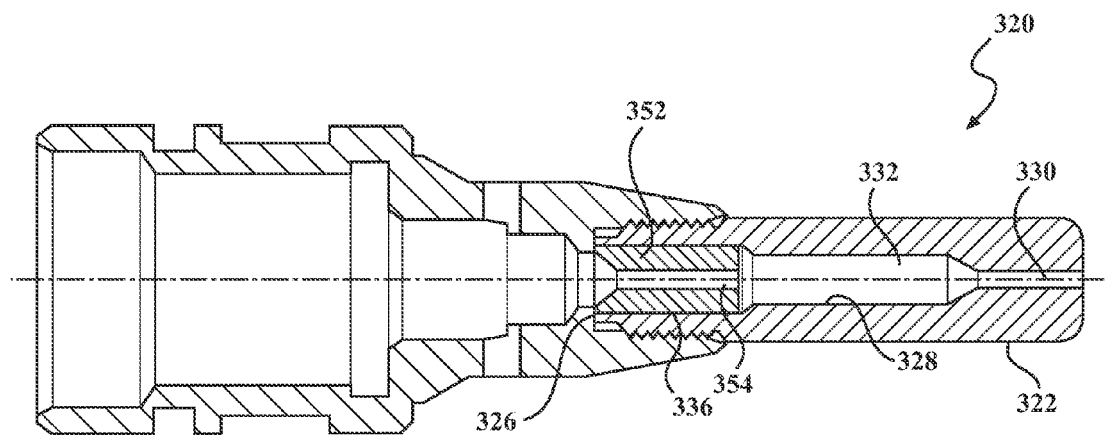
FIG. 6 is a sectional view of a contact tip and retaining head assembly in accordance with the present invention.

Turning to FIG. 6, the contact tip 320 may optionally include a rear insert 352 that is inserted into the rear portion 336 of the central aperture 328 through the opening at the rear end 326 of the contact tip. The rear insert 352 includes a central bore 354 extending through the rear insert. The central bore 354 is generally continuous with the central aperture 328 in the contact tip body 322, and generally defines the small diameter rear portion of the passageway through the contact tip 320 such that the diameter of the middle portion 332 of the aperture 328 is generally larger than the diameter of the front portion 330 of the aperture and larger than the diameter of the bore 354 in the rear insert.

Figure 7:
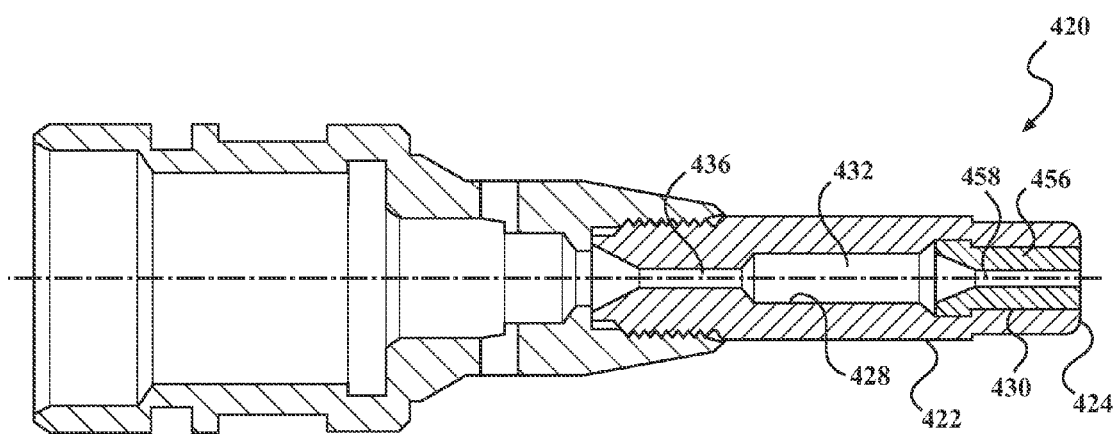
FIG. 7 is a sectional view of a contact tip and retaining head assembly in accordance with the present invention.

Turning to FIG. 7, the contact tip 420 may optionally include a front insert 456 that is inserted into the front portion 430 of the central aperture 428 through the opening at the front end 424 of the contact tip. The front insert 456 includes a central bore 458 extending through the front insert. The central bore 458 is generally continuous with the central aperture 428 in the contact tip body 422, and generally defines the small diameter front portion of the passageway through the contact tip 420 such that the diameter of the middle portion 432 of the aperture 428 is generally larger than the diameter of the rear portion 436 of the aperture 428 and larger than the diameter of the bore 458 in the rear insert.

The rear insert 352 and front insert 456 may be made of a material that is the different than the material of construction of the contact tip body. For example, the rear insert and front insert each may be made of copper, a copper alloy such as a precipitation hardened copper alloy or a mechanical alloyed copper alloy, a copper matrix composite, or a similarly suitable material.

Figure 8:
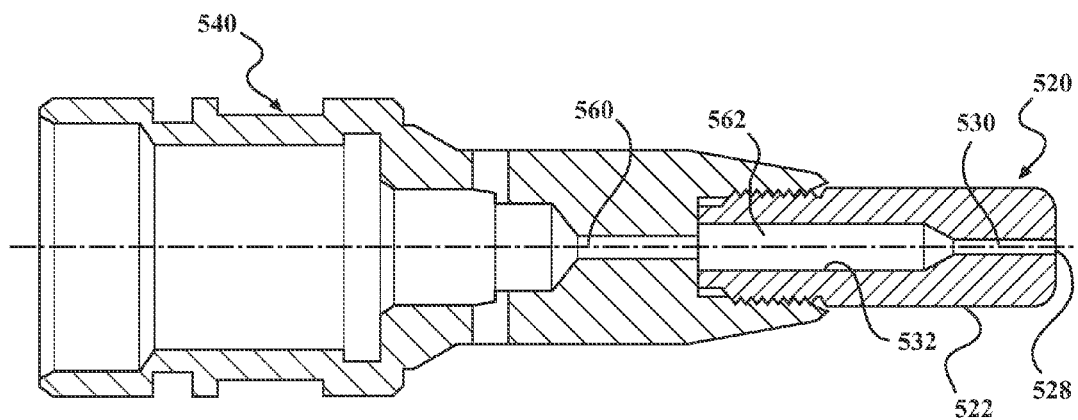
FIG. 8 is a sectional view of a contact tip and retaining head assembly in accordance with the present invention.

With reference to FIG. 8, as mentioned above, the contact tip 520 and retaining head 540 may together form an assembly and may define a passageway through the assembly for a consumable electrode wire. For example, the passageway may include the front portion 530 of the contact tip aperture 528, a rear portion 560 disposed in the retaining head 540, and a middle portion 562 at least partially defined by the wider diameter portion 532 of the contact tip aperture 528. In the embodiment shown in FIG. 8, the middle portion 562 is entirely defined by the wider diameter portion 532 of the contact tip aperture 528. The middle portion 562 formed in the contact tip body 522 is continuous with and adjacent to the rear portion 562 formed in the retaining head 540. The front portion 530 of the passageway has a length that is shorter than the length of the middle portion 562. For example, the length of the front portion 530 may be generally between 1.5 and 15 mm. A consumable electrode wire fed through the passageway does not contact the retaining head 540 and contact tip 520 in the middle portion 562 of the passageway and only contacts the retaining head and contact tip in the front portion 530 and rear portion 560 of the passageway.

Figure 9:
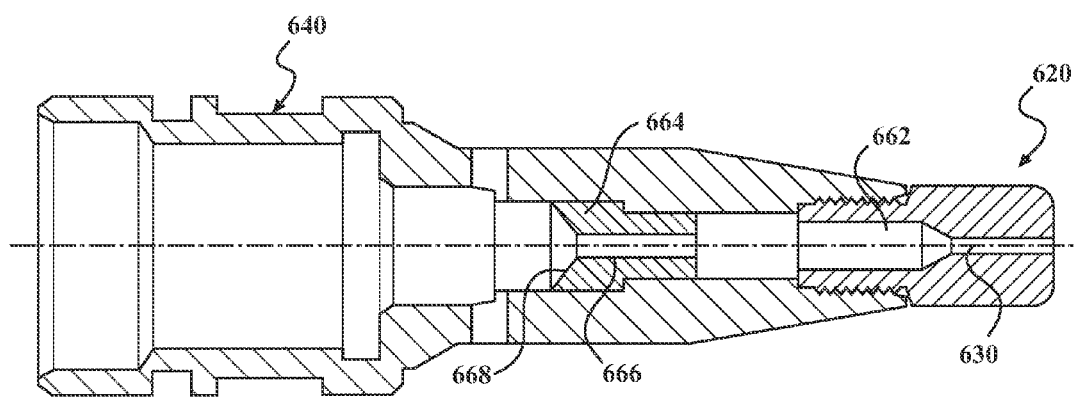
FIG. 9 is a sectional view of a contact tip and retaining head assembly in accordance with the present invention.

Optionally, as shown in FIG. 9, the middle portion 662 may be formed in both the contact tip 620 and retaining head 640. The middle portion 662 may have a variable diameter, as long as the middle portion is wider in diameter than the front portion 630 and rear portion 660 of the passageway, and an electrode wire does not touch any part of the wall of the middle portion 662 when fed through the assembly of the retaining head 640 and the contact tip 620.

Also, a rear insert 664 may be inserted into the retaining head 640. The rear insert 664 may be made of a copper alloy, a high hardness tool steel, cast iron, ceramics, PTFE, a PTFE containing polymer, or a similarly suitable material. The rear insert 664 includes a central bore 666 extending therethrough which forms a portion of the passageway and is generally continuous with the middle portion 662 of the passageway. The bore 666 through the rear insert 664 has a diameter that is generally smaller than the diameter of the middle portion 662 of the passageway. However, the bore 666 may include a slopped increased diameter portion 668 that forms a cone or other similar shape which aides in feeding an electrode wire into the rear insert 664.

Figure 10:
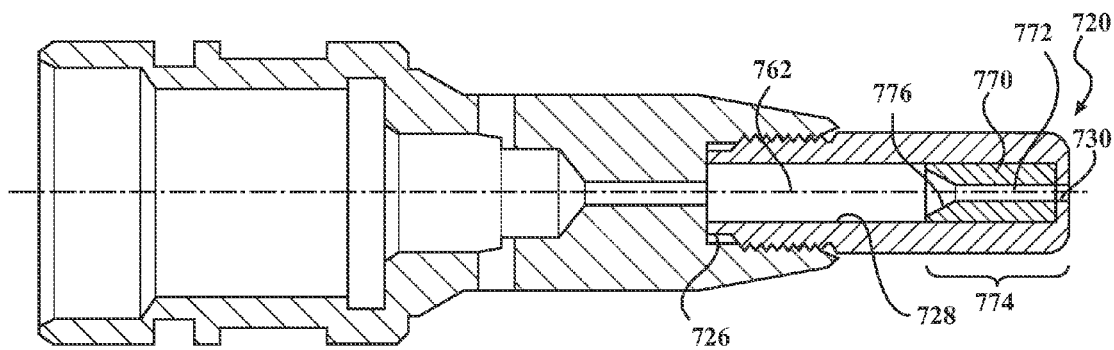
FIG. 10 is a sectional view of a contact tip and retaining head assembly in accordance with the present invention.

Turning to FIG. 10, the contact tip 720 may include a front insert 770 that is inserted into the central aperture 728 of the contact tip through the opening at the rear end 726. The front insert 770 includes a central bore 772 extending therethrough which partially defines the front portion 774 of the passageway. The remainder of the front portion 774 of the passageway is defined by the front portion 730 of the contact tip aperture 728. The central bore 772 of the front insert generally has a diameter that is smaller than the diameter of the middle portion 762 and is generally equal to or slightly smaller than the diameter of the front portion 730 of the contact tip aperture 728. However, the bore 772 may include a slopped increased diameter portion 776 that forms a cone or other similar shape which aides in feeding an electrode wire into the front insert 770.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A combination of a contact tip with a retaining head for a welding torch, wherein:
    said contact tip includes:
        an elongated, generally cylindrical body having a front contact end and an opposite rear retaining end; and
        a central aperture defined by an inner wall of said body, said aperture extending through said body from an opening at said rear end to an opening at said front end;
        said aperture having a front portion and a wider diameter elongated portion adjacent said front portion, said front portion generally having a length that is shorter than a length of said wider diameter portion;
    said retaining head has a front end, a rear end, and an opening at said front end;
    said contact tip being retained in said opening at said front end of said retaining head;
    said contact tip and said retaining head together define a passageway for said consumable electrode wire;
    said passageway including said front portion of said contact tip aperture, a rear portion disposed in said retaining head, and a middle portion at least partially defined by said wider diameter portion of said contact tip aperture;
    said front portion of said passageway having a length that is shorter than a length of said middle portion;
    wherein a consumable electrode wire fed through said passageway does not contact said retaining head and contact tip in said middle portion of said passageway and only contacts said retaining head and said contact tip in said front and rear portions of said passageway.

2. A welding torch assembly comprising:
    a retaining head; and
    a contact tip engaged with said retaining head;
    said retaining head and said contact tip together defining a passageway for a consumable electrode wire;
    said passageway including a front portion, a rear portion, and a middle portion between said front and rear portions;
    said front portion being formed by said contact tip, and said rear portion being formed by said retaining head;
    said middle portion having a diameter and a length that is larger than a length and a width of said front and rear portions;
    said middle portion of said passageway being formed by said contact tip and said retaining head together;
    wherein a consumable electrode wire fed through said passageway does not contact said retaining head and contact tip in said middle portion of said passageway and only contacts said retaining head and said contact tip in said front and rear portions of said passageway.

3. The welding torch assembly of claim 2, wherein the length of said front portion is generally between 1.5 mm and 15 mm.

4. The welding torch assembly of claim 2, including a rear insert inserted into said retaining head, said rear insert including a central bore extending therethrough, said bore of said rear insert at least partially forming said rear portion of said passageway and being generally continuous with said middle portion of said passageway.

5. The welding torch assembly of claim 2, including a front insert inserted into said contact tip, said front insert including a central bore extending therethrough, said bore of said front insert at least partially forming said front portion of said passageway and being generally continuous with said middle portion of said passageway.

6. The combination of claim 1, wherein said aperture has a generally stepped cross-sectional shape along an axial direction.

7. The combination of claim 1, wherein:
    the diameter of said front portion is generally 2% to 10% greater than a diameter of said consumable electrode wire that is fed through said aperture;
    the diameter of said rear portion is generally 5% to 15% greater than the diameter of said consumable electrode wire; and
    the diameter of said middle portion is at least generally 0.15 mm larger than the diameter of said front portion.

8. The combination of claim 1, wherein:
    the length of said front portion is generally between 1.5 mm and 15 mm;
    a length of said rear portion is generally between 1.5 mm and 15 mm; and
    the length of said middle portion is greater than the length of said front portion and said rear portion.

9. The combination of claim 1, wherein the diameter of said wider diameter portion is variable.

10. The combination of claim 1, wherein said body is formed of two interlocking members.

11. The combination of claim 1, wherein the length of said front portion is generally between 1.5 mm and 15 mm.

12. The combination of claim 1, wherein said middle portion is defined by said wider diameter portion of said contact tip aperture and said opening of said retaining head.

13. The combination of claim 1, including a rear insert inserted into said retaining head, said rear insert including a central bore extending therethrough, said bore of said rear insert forming a portion of said passageway and being generally continuous with said middle portion of said passageway.

14. The combination of claim 1, including a front insert inserted into said opening at said rear end of said contact tip body, said front insert including a central bore extending therethrough, said bore of said front insert partially defining said front portion of said passageway and being generally continuous with said middle portion of said passageway.

* * * * *